United States Patent
Ooue et al.

[11] Patent Number: 6,157,431
[45] Date of Patent: Dec. 5, 2000

[54] LIQUID CRYSTAL DISPLAY APPARATUS SUPPRESSED OF ORIENTATION DEFECT HAVING METAL FILM AND PHOTOSENSITIVE RESIN AS A COLUMNAR SPACER AND FABRICATION METHOD THEREOF

[75] Inventors: Makoto Ooue, Ikoma; Shinji Shimada, Kashihara, both of Japan

[73] Assignee: Sharp Kabushiki Kaisha, Osaka, Japan

[21] Appl. No.: 09/034,577

[22] Filed: Mar. 4, 1998

[30] Foreign Application Priority Data

Mar. 11, 1997 [JP] Japan ................................. 9-055741

[51] Int. Cl.⁷ .................... G02F 1/1339; G02F 1/1337
[52] U.S. Cl. ................................. 349/155; 349/125
[58] Field of Search ......................... 349/155, 125

[56] References Cited

U.S. PATENT DOCUMENTS

| | | | |
|---|---|---|---|
| 5,499,128 | 3/1996 | Hasegawa et al. | 359/81 |
| 5,739,882 | 4/1998 | Shimizu et al. | 349/123 |
| 5,936,600 | 8/1999 | Ohashi et al. | 345/87 |
| 5,978,061 | 11/1999 | Miyazaki et al. | 349/155 |
| 6,064,461 | 5/2000 | Nishida | 349/155 |

FOREIGN PATENT DOCUMENTS

| | | |
|---|---|---|
| 60-182414 | 9/1985 | Japan . |
| 4-163423 | 6/1992 | Japan . |
| 10-253968 | 9/1998 | Japan . |

*Primary Examiner*—Kenneth Parker
*Assistant Examiner*—Mike Qi
*Attorney, Agent, or Firm*—Dike, Bronstein, Roberts & Cushman, LLP; David G. Conlin

[57] ABSTRACT

A liquid crystal display apparatus suppressed of orientation defect includes a first substrate having a main surface, a liquid crystal drive element formed on the main surface of the first substrate, an oriented film formed on the main surface of the first substrate, a patterned metal film on the oriented film, photosensitive resin formed on the metal film, a second substrate arranged facing the first substrate with the metal film and the photosensitive resin as a spacer, and a liquid crystal compound filled between the first and second substrates. Also, a method of fabricating this liquid crystal display apparatus is claimed.

12 Claims, 4 Drawing Sheets

LIQUID CRYSTAL DISPLAY APPARATUS SUPPRESSED OF ORIENTATION DEFECT HAVING METAL FILM AND PHOTOSENSITIVE RESIN AS A COLUMNAR SPACER AND FABRICATION METHOD THEREOF

BACKGROUND OF THE INVENTION

1. Field of the Invention

The present invention relates to liquid crystal display apparatuses and a fabrication method thereof. More particularly, the present invention relates to a liquid crystal display apparatus suppressed of orientation defect and a method of fabricating such a liquid crystal display apparatus.

2. Description of the Background Art

In a conventional liquid crystal display apparatus employing a thin film transistor, an oriented film is applied after forming a thin film transistor on a substrate, and plastic beads and the like are applied after a rubbing process for the purpose of achieving uniform cell thickness. However, in the case where light of 1,000,000 lx is directed as in projection, light will pass through due to the plastic beads. A portion will become the illuminance point. To solve this problem, Japanese Patent Laying-Open No. 60-182414 discloses a method of achieving uniform cell thickness. Instead of plastic beads, photosensitive resin is applied having a thickness corresponding to the diameter of the plastic beads on a substrate where an oriented film subjected to rubbing is formed. By forming a columnar pattern, the thickness of the cell is rendered uniform.

However, a molecular film is adsorbed at the surface of the oriented film when photosensitive resin is applied on the oriented film and patterned in columnar configuration. The orientation directivity was degraded to induce orientation defect by the technique disclosed in Japanese Patent Laying-Open No. 60-182414.

SUMMARY OF THE INVENTION

In view of the foregoing, an object of the present invention is to provide a liquid crystal display apparatus suppressed in orientation defect and a fabrication method thereof.

Another object of the present invention is to provide a liquid crystal display apparatus that can maintain a constant substrate distance and that has orientation defect suppressed.

A further object of the present invention is to provide a method of fabricating a liquid crystal display apparatus that can have a metal film formed without damaging the oriented film and that is suppressed in orientation defect.

According to an aspect of the present invention, a liquid crystal display apparatus includes a first substrate having a main surface, a liquid crystal drive element formed on the main surface of the first substrate, an oriented film formed on the main surface of the first substrate, a patterned metal film on the oriented film, photosensitive resin formed on the metal film, a second substrate arranged facing the first substrate with the metal film and the photosensitive resin as a spacer, and a liquid crystal compound filled between the first and second substrates.

The photosensitive resin can be formed on the oriented film without damaging the surface of the oriented film that is orientation-treated. Thus, a liquid crystal display apparatus suppressed of orientation defect can be provided.

Preferably, the metal film is formed on the liquid crystal drive element. Therefore, light entering the liquid crystal drive element is blocked.

Further preferably, the metal film and the photosensitive resin are implemented as a columnar spacer. Therefore, the distance between the substrate is maintained constant.

According to another aspect of the present invention, a method of fabricating a liquid crystal display apparatus is provided. The liquid crystal display apparatus includes a pair of insulative substrates provided with clear electrodes. The substrates face each other with a gap therebetween and the clear electrodes located at the inner sides. The overlapping portion of the clear electrodes functions as a picture element electrode. There is at least a liquid crystal compound in the gap. The fabrication method of the liquid crystal display apparatus includes the steps of forming a metal film on an oriented film subjected to an orientation treatment, forming photosensitive resin on the metal film, patterning the photosensitive resin, and etching the metal film using the patterned photosensitive resin as a mask.

In etching the photosensitive resin, an organic type solvent is used. However, a metal film is provided between the oriented film and the photosensitive resin. This metal film is not easily dissolved by the organic type solvent. Therefore, the photosensitive resin can be patterned without damaging the oriented film. In etching the metal film, acid is also used. However, the oriented film and the photosensitive resin are impervious to acid. Therefore, the spacer can be formed without affecting the oriented film and the patterned photosensitive resin. Thus, a method of fabricating a liquid crystal display apparatus suppressed in orientation defect can be provided.

The foregoing and other objects, features, aspects and advantages of the present invention will become more apparent from the following detailed description of the present invention when taken in conjunction with the accompanying drawings.

DESCRIPTION OF THE PREFERRED EMBODIMENT

Figure 1A:
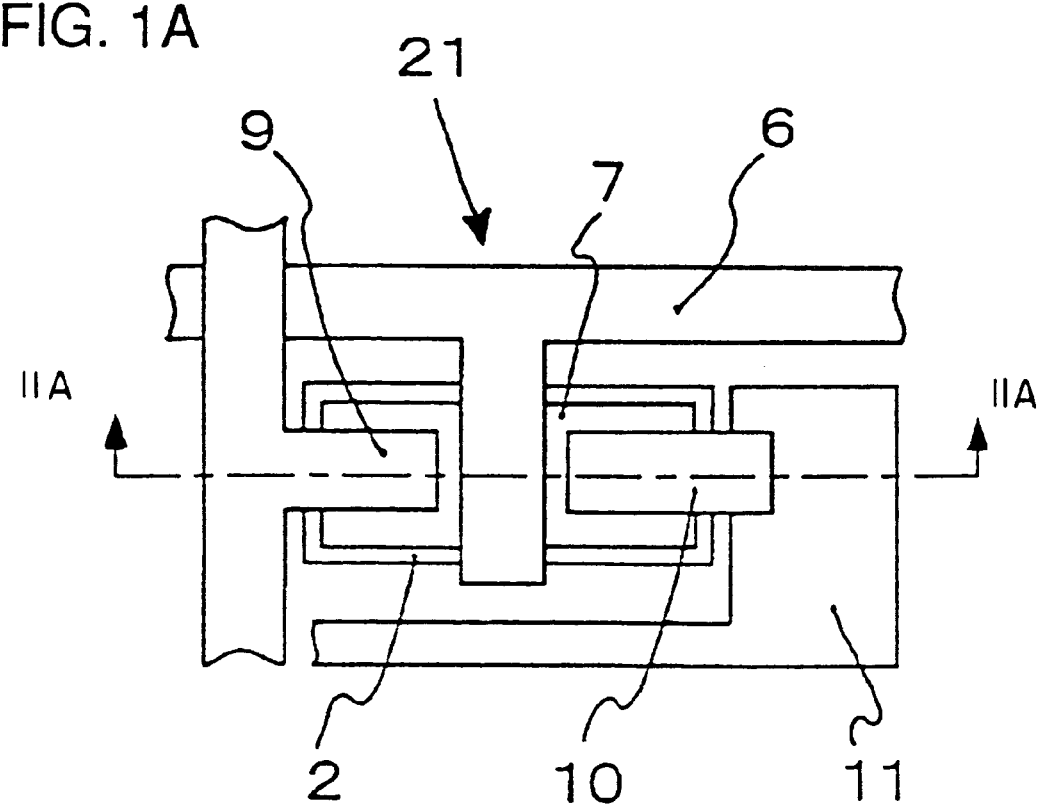
FIGS. 1A and 1B show layouts of thin film transistors applied in a liquid crystal display apparatus.
Figure 1B:
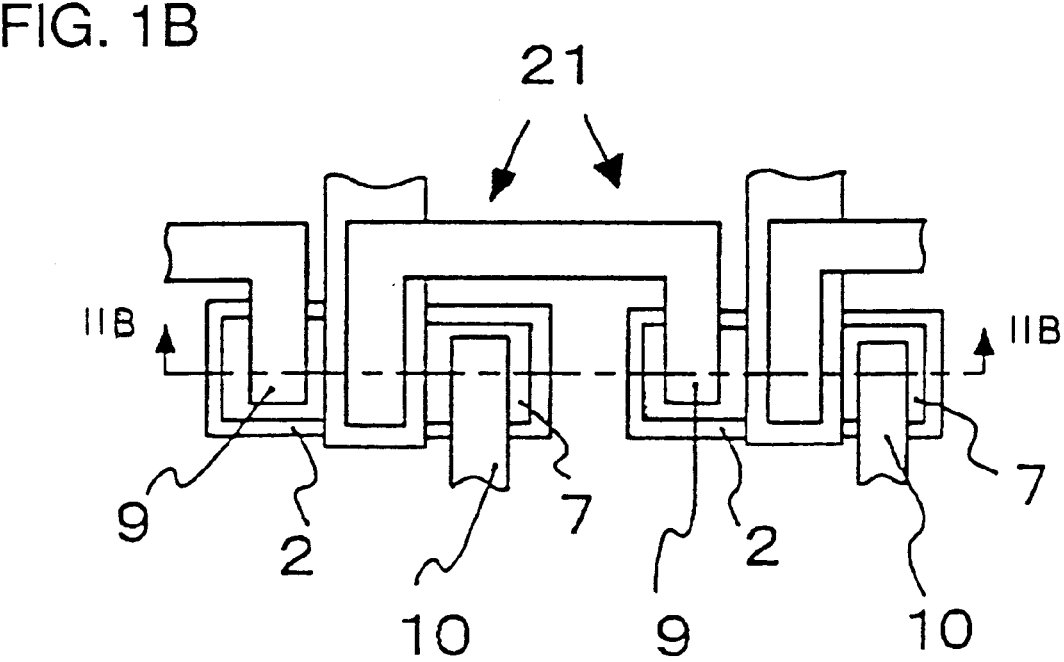
Figure 2A:
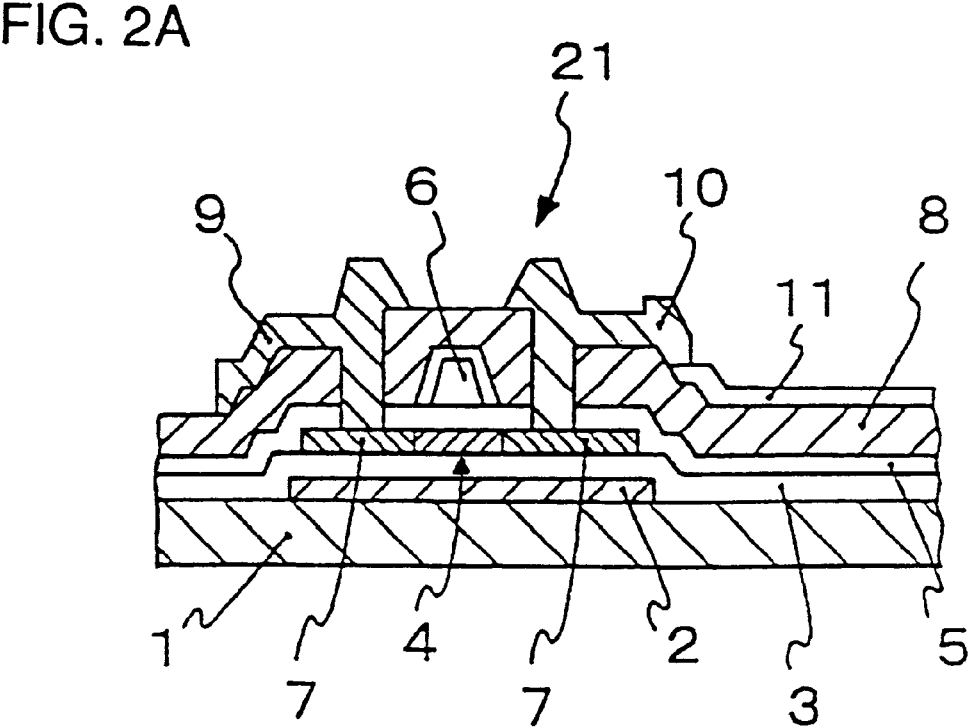
FIGS. 2A and 2B are sectional views of the thin film transistors of FIGS. 1A and 1B taken along line IIA—IIA and line IIB—IIB, respectively.
Figure 2B:
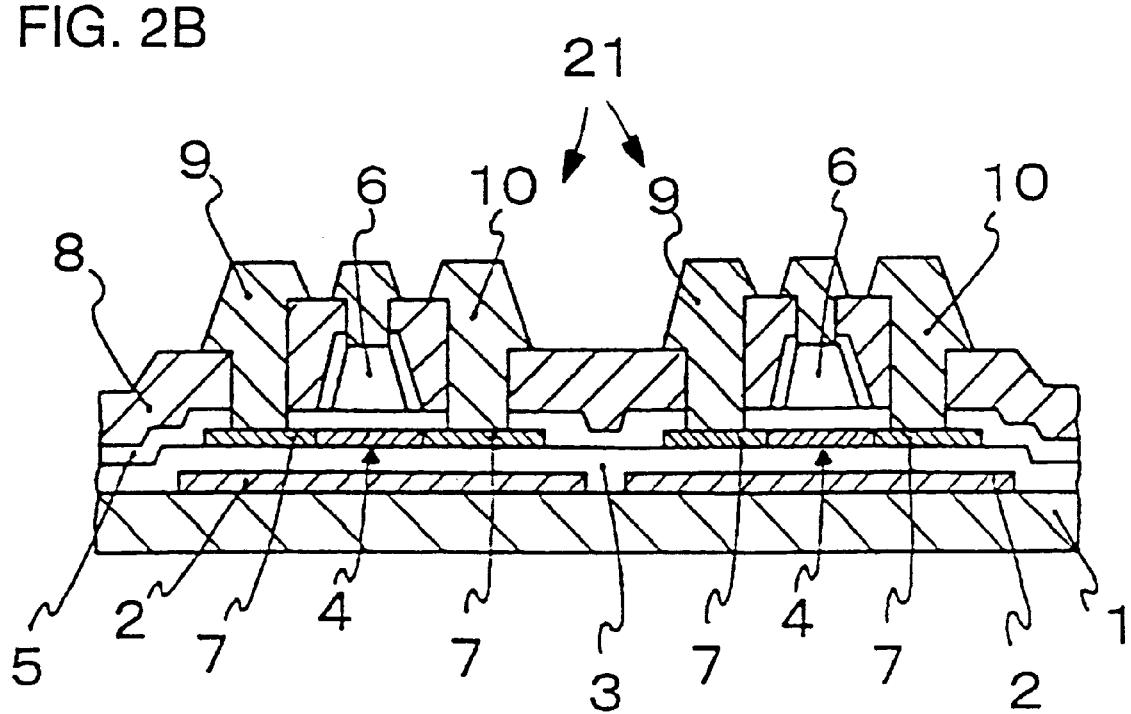

FIGS. 1A and 2A show a structure of a thin film transistor of the picture element portion applied in a liquid crystal display apparatus of the present invention. FIGS. 1B and 2B show a structure of a thin film transistor of a periphery drive circuit portion.

A thin film transistor will be described hereinafter with reference to FIGS. 1A, 1B, 2A and 2B. Ta is deposited by sputtering for 100 nm on an insulative substrate 1 having an insulative surface such as of glass or quartz. A patterning process is applied to form a light blocking film 2. Then, an insulation film 3 of SiNx and $SiO_2$ is deposited thereon for 300 nm–500 nm by, for example, plasma CVD (Chemical Vapor Deposition).

A semiconductor film such as a p-Si film is provided by low pressure chemical vapor deposition (LPCVD) for a thickness of 25 nm–200 nm, desirably 70 nm–100 nm. A patterning process is applied to form a conductor layer 4.

A gate insulation film of $SiO_2$ is formed on semiconductor layer 4 by PCVD (Plasma Enhanced Chemical Vapor Deposition), for example, for a thickness of 200 nm–500 nm, desirably approximately 200 nm. A patterning process is applied to form a gate insulation film 5.

A metal film is formed thereon by sputtering, for example, for 200 nm–400 nm to form a gate electrode 6.

Impurities of group V elements such as phosphorus or a compound thereof and group III elements such as boron or a compound thereof are ion-implanted from above to the channel region at the acceleration voltage of 50 keV–100 keV to form a contact layer 7.

An insulation film of SiNx and $SiO_2$ is deposited by, for example, plasma CVD for 300 nm–500 nm. A predetermined portion is etched to form a contact hole. Then, an interlayer insulation film 8 is formed.

A conductive film is deposited from above by sputtering, for example, for 200 nm–700 nm to form a source electrode 9 and a drain electrode 10. An indium tin oxide film (ITO) is deposited thereon by sputtering, for example, for 50 nm–100 nm to form a picture element electrode 11. Thus, a TFT (Thin Film Transistor) 21 is completed as a switching element.

The method of forming a projection on a TFT substrate formed as above will be described hereinafter with reference to FIGS. 3A–3F.

Figure 3A:
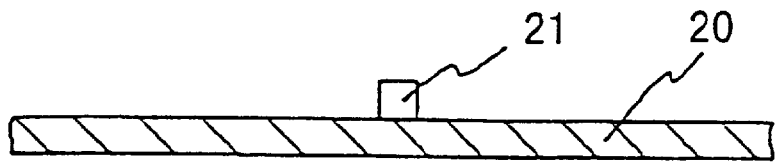
FIGS. 3A–3F show fabrication steps of a columnar spacer.
Figure 3B:
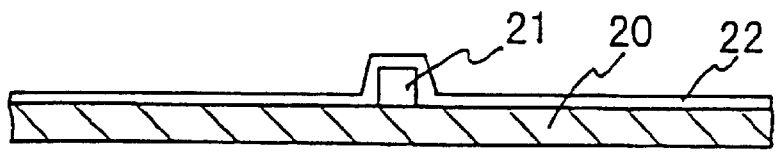
Figure 3C:
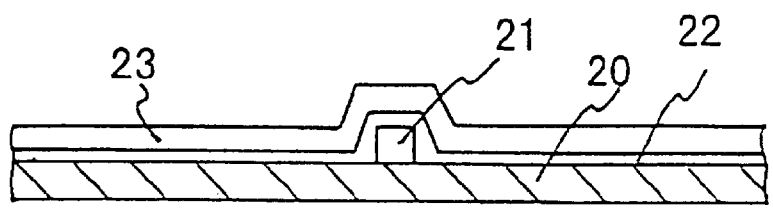
Figure 3D:
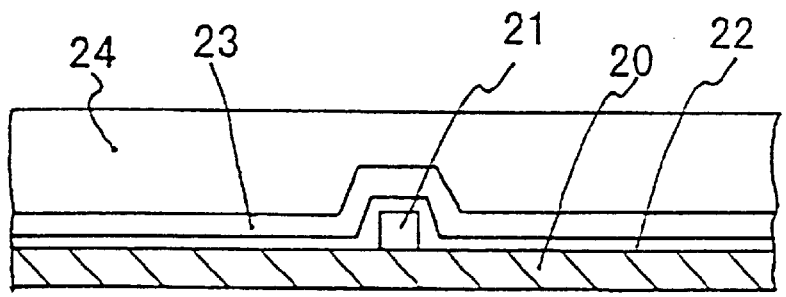
Figure 3E:
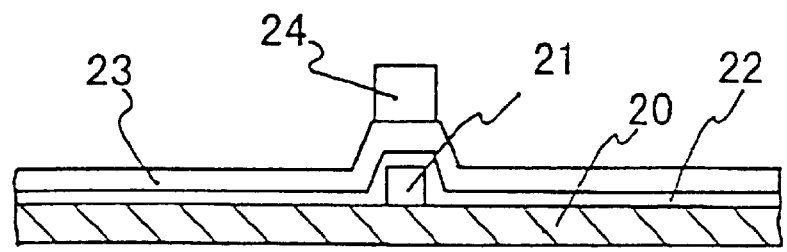
Figure 3F:
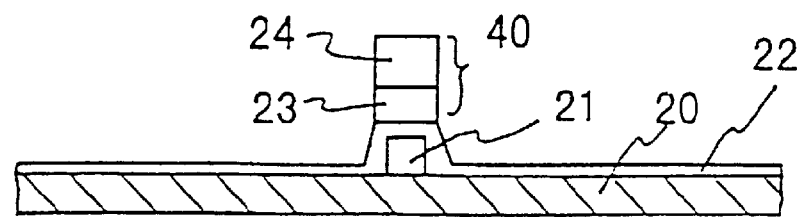

Referring to FIGS. 3A and 3B, an oriented film 22 is applied on a TFT substrate 20 where TFT 21 is formed. An orientation treatment is applied thereto. Referring to FIG. 3C, a metal film 23 is formed by sputtering. Referring to FIG. 3D, photosensitive resin 24 is applied for 4 $\mu$m–5 $\mu$m on metal film 23. Referring to FIGS. 3E and 3F, a patterning process is applied so that the resin is left on metal film 23, preferably on TFT 21.

The cell thickness is controlled by the formed column 40 serving as a spacer. Also, the resin on TFT 21 allows metal film 23 to remain on TFT 21 to block light from above.

Acrylic acid, methacrylic acid, ester of polyhydric alcohol, acrylamide, methacrylamide, and the like can be used for photosensitive resin 24. Also, a black resin film having a black filler dispersed can be used.

Figure 4:
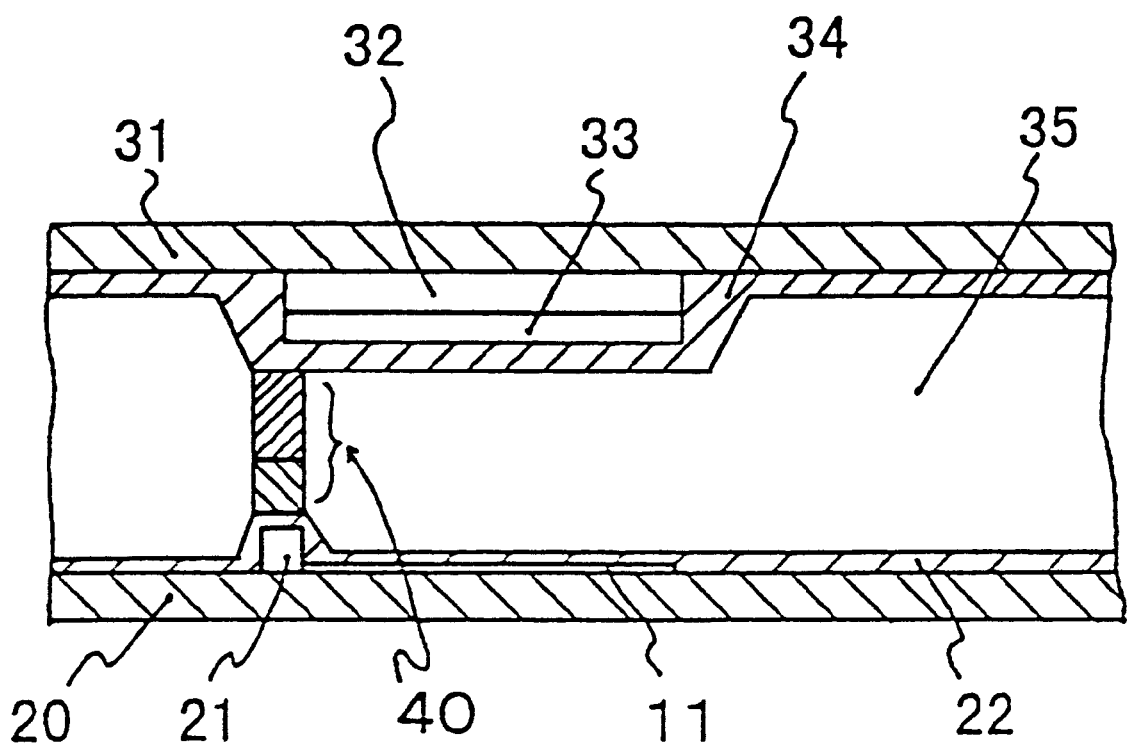
FIG. 4 is a sectional view of a liquid crystal display apparatus.

Referring to FIG. 4, a pigment disperse color filter 32 is formed by printing, electrodeposition, or with a spin coater on an insulative substrate 31 having an insulation surface such as of glass or quartz at the opposite substrate side. Then, a patterning process is carried out to obtain a predetermined configuration. As a clear conductive film on color filter 32, indium tin oxide (ITO) is deposited by sputtering, for example, for 50 nm–100 nm. A counter electrode 33 is formed as the opposite substrate. Then an oriented film 34 is applied thereon. Film 34 is orientation-treated.

Then, both substrates are bound using seal resin so that picture element electrode 11 of the TFT substrate is aligned with color filter 32 on the opposing substrate. Liquid crystal 35 is injected into the attached substrates. Then, the inlet through which liquid crystal 35 is inserted is sealed. Next, baking is effected to stabilize the orientation of the liquid crystal. Thus, a liquid crystal display apparatus is completed.

In a liquid crystal display apparatus with a switching element at one of a pair of insulative substrates arranged facing each other, an oriented film subjected to an orientation process, a metal film formed on the oriented film by patterning, and photosensitive resin formed on the metal film are provided on one insulative substrate. Therefore, the photosensitvie resin can be formed on the oriented film without damaging the surface of the oriented film that is subjected to an orientation process.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A liquid crystal display apparatus comprising:

a first substrate having a main surface, a liquid crystal drive element formed on the main surface of said first substrate, an oriented film formed on the main surface of said first substrate, a patterned metal film on said oriented film, photosensitive resin formed on said metal film, a second substrate arranged facing said first substrate with said metal film and said photosensitive resin as a spacer, and a liquid crystal compound filled between said first and second substrate.

2. The liquid crystal display apparatus according to claim 1, wherein said metal film is formed on said liquid crystal drive element.

3. The liquid crystal display apparatus according to claim 2, wherein said metal film and said photosensitive resin are a columnar spacer.

4. The liquid crystal display apparatus according to claim 3, wherein said photosensitive resin is selected from the group consisting of acrylic acid, methacrylic acid, ester of polyhydric alcohol, acrylamide and methacrylamide.

5. The liquid crystal display apparatus according to claim 4, wherein said liquid crystal drive element is a thin film transistor.

6. The liquid crystal display apparatus according to claim 1, wherein said metal film and said photosensitive resin are a columnar spacer.

7. The liquid crystal display apparatus according to claim 6, wherein said photosensitive resin is selected from the group consisting of acrylic acid, methacrylic acid, ester of polyhydric alcohol, acrylamide and methacrylamide.

8. The liquid crystal display apparatus according to claim 7, wherein said liquid crystal display element is a thin film transistor.

9. The liquid crystal display apparatus according to claim 1, wherein said photosensitive resin is selected from the group consisting of acrylic acid, methacrylic acid, ester of polyhydric alcohol, acrylamide and methacrylamide.

10. The liquid crystal display apparatus according to claim 9, wherein said liquid crystal drive element is a thin film transistor.

11. The liquid crystal display apparatus according to claim 1, wherein said liquid crystal display element is a thin film transistor.

12. A method of fabricating a liquid crystal display apparatus including a pair of insulative substrates provided with clear electrodes facing each other having a gap therebetween and said clear electrodes located at inner sides, wherein an overlapping portion of said clear electrodes function as a picture element electrode, and including at least a liquid crystal compound at said gap, said fabrication method comprising the steps of:

forming a metal film on an oriented film subjected to an orientation treatment, forming photosensitive resin on said metal film, patterning said photosensitive resin, and etching said metal film using said patterned photosensitive resin as a mask.

\* \* \* \* \*